Figure 1:
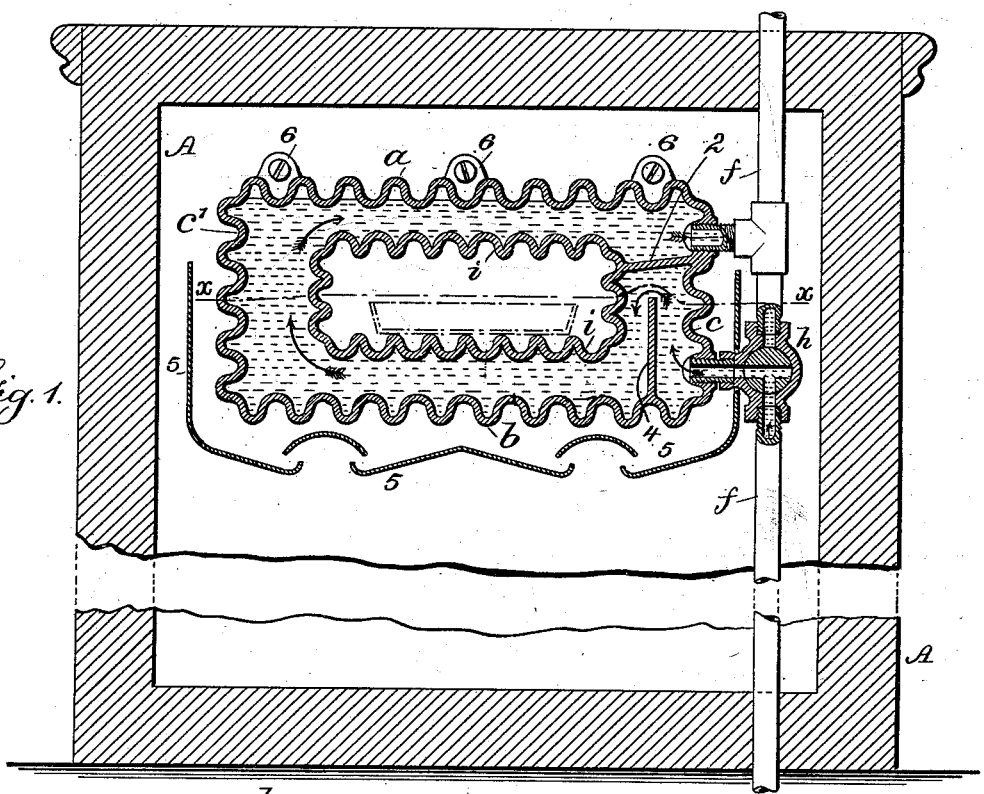

No. 650,217. Patented May 22, 1900.
J. J. BAILEY.
STORAGE AND CIRCULATION TANK FOR REFRIGERATORS.
(Application filed Sept. 19, 1899.)
(No Model.) 2 Sheets—Sheet 1.

Witnesses Inventor
Chas H. Smith John J. Bailey
J. Staib by L. W. Serrell & Son
Attys

THE NORRIS PETERS CO., PHOTO-LITHO., WASHINGTON, D. C.

No. 650,217. Patented May 22, 1900.
J. J. BAILEY.
STORAGE AND CIRCULATION TANK FOR REFRIGERATORS.
(Application filed Sept. 19, 1899.)
(No Model.) 2 Sheets—Sheet 2.

Witnesses
Chas. H. Smith
Geo. T. Pinckney

Inventor
John J. Bailey
per L. W. Serrell & Son
Atty

UNITED STATES PATENT OFFICE.

JOHN J. BAILEY, OF NEW YORK, N. Y.

STORAGE AND CIRCULATION TANK FOR REFRIGERATORS.

SPECIFICATION forming part of Letters Patent No. 650,217, dated May 22, 1900.

Application filed September 19, 1899. Serial No. 730,971. (No model.)

*To all whom it may concern:*

Be it known that I, JOHN J. BAILEY, a citizen of the United States, residing at New York city, in the county and State of New York, have invented an Improvement in Storage and Circulation Tanks for Refrigerators, of which the following is a specification.

My invention relates to storage and circulation tanks for liquid refrigerating mixtures, and the same is especially adapted for use in refrigerators in apartment and flat houses where a series of refrigerators are connected and wherein the refrigerating mixtures are advantageously supplied from a common source, the use of the refrigerating mixtures being under the control of each occupant, so that the various refrigerators are operatively independent of one another.

My improvement is a substitute in a family-refrigerator for a cake of ice, and in carrying out this invention I make use of a cast-iron tank located in the upper portion of the refrigerator in the place usually employed as a receptacle for ice. The cast-iron tank is preferably provided with a hollow open-ended center, and it is connected to a supply-pipe passing from the source of the refrigerating mixture to and through each refrigerator, that may be connected together in series. Each cast-iron tank comprises a top, bottom, sides, and ends, and the hollow open-ended center also comprises a top and bottom and sides, the ends connecting the various walls or parts, and within the cast-iron tank I provide a horizontal partition, the supply-pipe being connected to the tank below the horizontal partition by a cock and above the horizontal partition by a coupling, the freezing mixture flowing into the lower portion of the tank, around the same, and above the partition to and away by the rising pipe, and I prefer to place a vertical partition within the tank adjacent to the entrance for the freezing mixture, so that the same is caused to flow over the vertical partition beneath the horizontal partition and so around through the tank. The walls of the top, bottom, and sides of the cast-iron tank, both external and internal, may be partially or wholly plain or corrugated. I prefer to employ corrugations, because thereby greater surface is provided for the radiation of the cold from the freezing mixtures.

Figure 2:
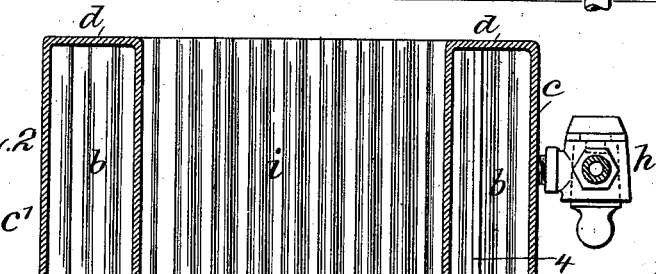
Figure 3:
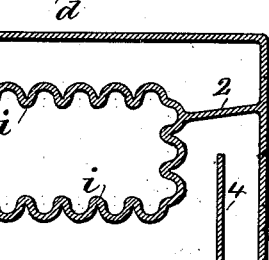
Figure 4:
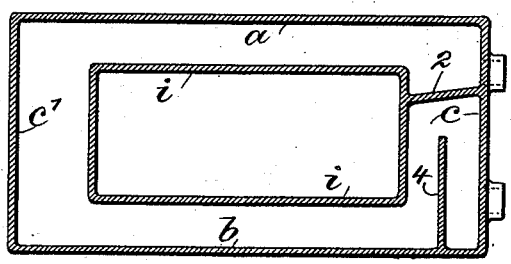

In the drawings, Figure 1 is a broken vertical section at the upper and lower portions of the refrigerator. Fig. 2 is a sectional plan at $x$ $x$ of Fig. 1. Figs. 3 and 4 represent by vertical sections modifications of the cast-iron tank, and Fig. 5 several refrigerators of an apartment connected in series.

The refrigerator A may be of any desired construction, and in the upper portion thereof partitions 5 are preferably provided for controlling the circulation of air and gathering the water of condensation, but these parts form no necessary part of my invention.

Figure 5:
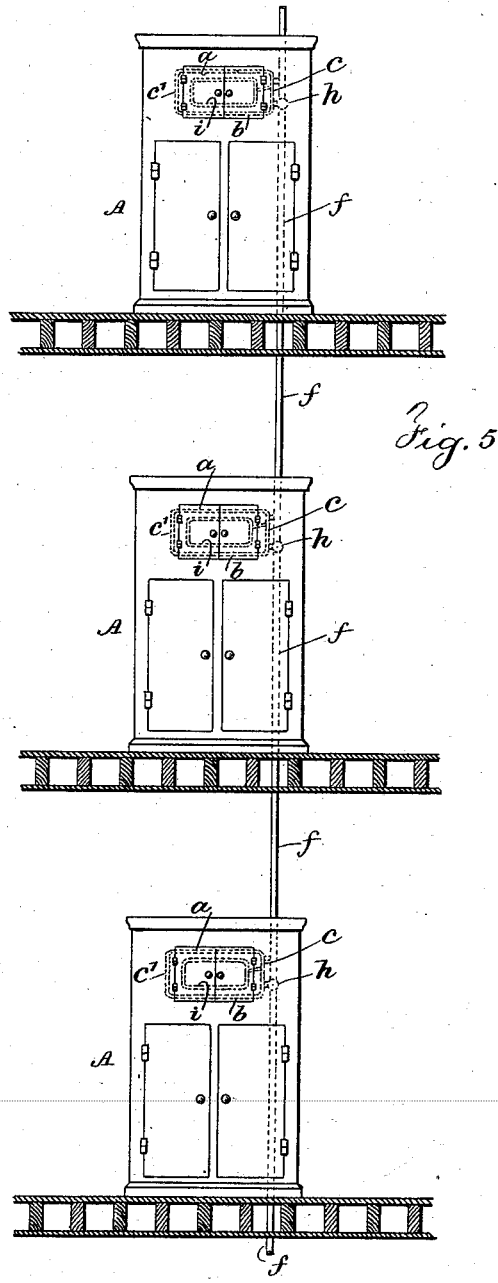

The cast-iron tank, with its hollow open-ended center, is preferably a casting integral in its entirety and comprising the top $a$, the bottom $b$, sides $c$ $c'$, and the flat closing ends $d$ $d$, together with the horizontal partition 2, connecting the outer wall of the side $c$ with the inner wall of the hollow center $i$. This hollow center has a top, bottom, and sides parallel to the similar portions of the exterior and is open at the ends, the flat ends $d$ $d$ only extending between the exterior walls and the portions of the hollow center, so that there is an opening clear through the cast-iron tank, which opening provides for the reception of a pan (shown in Fig. 1 in dotted lines) in which water may be placed for the formation of ice or in which hollow center various articles may be placed the temperature of which it is desired to reduce to or below the freezing-point. A vertical partition 4 within the tank is integral with the bottom and rises beneath the partition 2, the said partitions being adjacent to the threaded bosses to which the pipes $f$ are coupled. A cock $h$ is provided in the pipe $f$, connecting to the lower part of the cast-iron tank. The pipes $f$ extend to the other tanks in series, as shown in Fig. 5.

The freezing mixture preferred is cold brine, and the same rises in the pipe $f$, passes through the cock $h$ in the position shown in Fig. 1 and into the hollow tank, and rising between the side and the partition 4 flows over the partition, down and around the tank, and over the partition 2 and away by the pipe $f$, so that a complete circulation is insured around the hollow center. These freezing mixtures retain their degree of cold for many hours, and it is estimated that the flow of the freezing mixture can be closed off during the night without the temperature of the mixture rising to much above the freezing-point. Therefore when it is desired to stop the circulation through the tank and close off the freezing mixture for a time the cock is turned so as to close the opening into the tank and permit the freezing mixture to flow directly by and through the pipes *f*.

In Fig. 1 I have shown the external wall of the tank and the wall of the hollow center, both external and internal, as corrugated, because in this construction there is a greater surface for the radiation of the cold; but I do not limit myself to using these corrugated walls, as the cast-iron tank may be made, as shown in Fig. 3, with the external walls plain and the walls of the hollow center corrugated, or, as shown in Fig. 4, with both the external walls and the walls of the hollow center plain and straight.

The cast-iron tank may be supported in any desired manner. I have shown in Fig. 1 lugs 6, through which screws pass to support the tank from the walls of the refrigerator; but the means of support is entirely immaterial and forms no part of the invention.

I claim as my invention—

1. The combination with a refrigerator, of a storage and circulation vessel for liquid refrigerating mixtures comprising a cast-metal tank, a supply-pipe extending from other tanks in series, a connection to the tank, a discharge-pipe extending to other tanks in series, and a connection to the tank therefrom, the parts being so constructed that the refrigerating mixture circulates through the tank, substantially as set forth.

2. The combination with a refrigerator, a length of pipe passing through the same from other refrigerators, a cock in said length of pipe and couplings connected thereto and to the pipe, of a storage and circulation vessel for liquid refrigerating mixtures comprising a cast-metal tank, the same having openings to which the couplings of the pipes are connected, an internal wall to the tank forming an open-ended center and partitions within the tank for directing the flow or circulation of the refrigerating mixture, substantially as and for the purposes set forth.

3. As a new article of manufacture, a vessel for refrigerators for the storage and circulation of refrigerating mixtures, comprising a tank having a top, bottom, sides and ends integrally made in one piece of metal with internal walls forming a hollow center opening through the ends, substantially as set forth.

4. As a new article of manufacture, a vessel for refrigerators for the storage and circulation of refrigerating mixtures comprising a tank having a top, bottom, sides and ends integrally made with internal walls forming a hollow center opening through the ends, a vertical partition in one part of the tank and an approximately-horizontal partition over the vertical partition, and adjacent threaded openings for pipes, substantially as set forth.

5. A vessel for refrigerators connected in series for the storage and circulation of refrigerating mixtures, comprising a cast-iron tank having external top, bottom and sides corrugated and flat ends and internal corrugated walls leaving an open center through the flat ends, the said parts being an integral casting, pipes and couplings therefrom to the said tank and a cock in the pipe for supplying the freezing mixture and for closing off the supply, substantially as set forth.

6. A vessel for refrigerators connected in series for the storage and circulation of refrigerating mixtures, comprising a cast-iron tank having external top, bottom and sides corrugated and flat ends and internal corrugated walls leaving an open center through the ends, the said parts being an integral casting, pipes and couplings therefrom to the said tank and a cock in the pipe for supplying the freezing mixture and for closing off the supply, there being an integral substantially-horizontal partition and an integral vertical partition beneath the horizontal partition and within the tank for directing the flow of the refrigerating mixture, substantially as set forth.

Signed by me this 15th day of September, A D. 1899.

JOHN J. BAILEY.

Witnesses:
HAROLD SERRELL,
S. T. HAVILAND.